Aug. 7, 1945.   J. E. DEMBENSKI   2,381,530
SANITARY DENTAL FLOSS HOLDER
Filed May 25, 1944
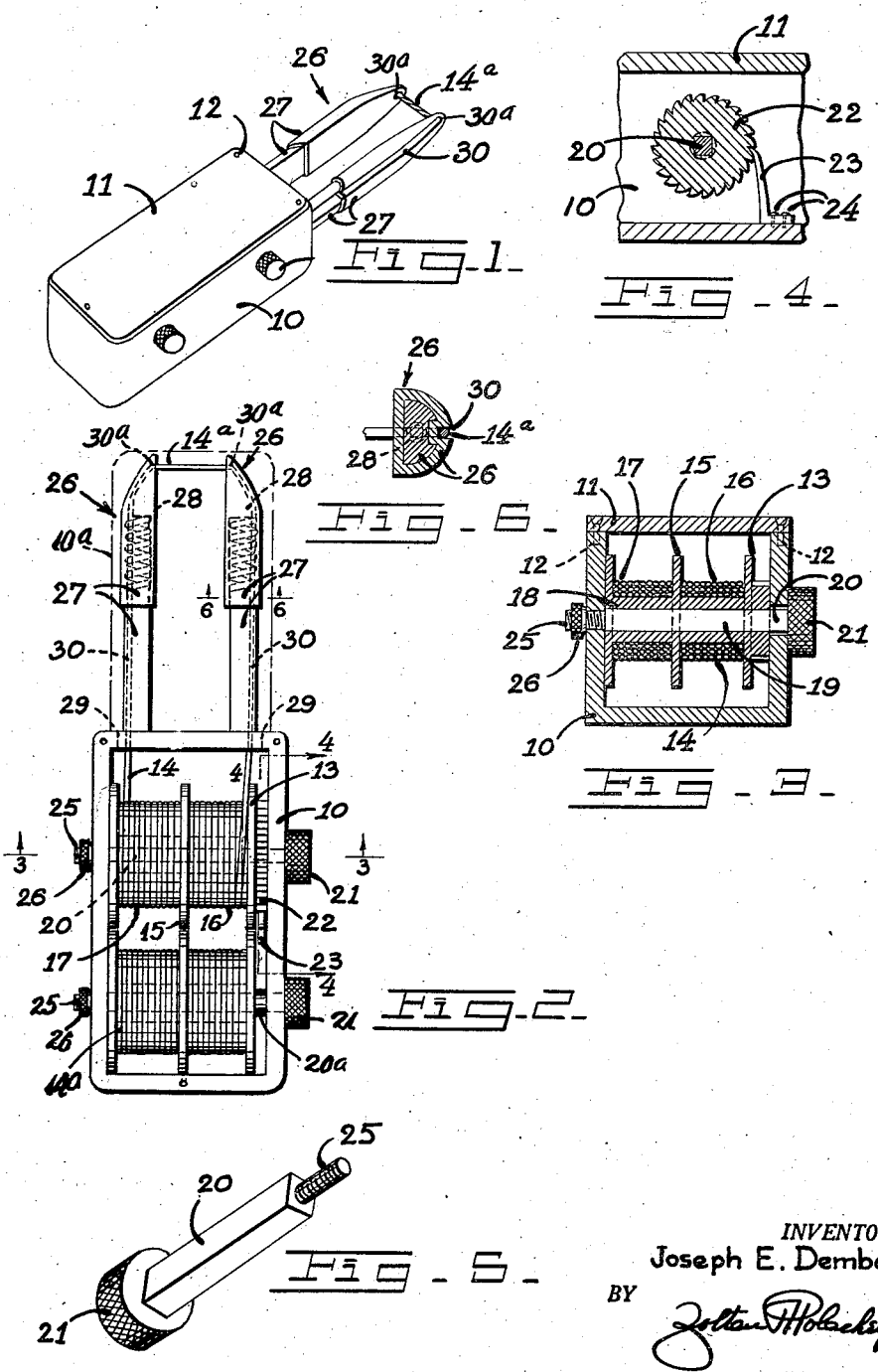
INVENTOR.
Joseph E. Dembenski
ATTORNEY Patented Aug. 7, 1945

2,381,530

UNITED STATES PATENT OFFICE 2,381,530

SANITARY DENTAL FLOSS HOLDER

Joseph E. Dembenski, New York, N. Y.

Application May 25, 1944, Serial No. 537,248

4 Claims. (Cl. 132—92)

This invention relates to new and useful improvements in a sanitary dental floss holder.

More specifically, the invention proposes the construction of a sanitary dental floss holder constructed in a novel manner to permit areas of the dental floss to be exposed between a pair of spaced fingers extending from the holder. It is proposed to construct the holder in such a manner that the exposed portion of the dental floss may be engaged between the adjacent faces of one's teeth in a manner to remove food particles and other materials lodged between the teeth.

A further object of the invention proposes characterizing the dental floss holder by a casing designed to enclose a drum for dental floss and which has a new section for new dental floss, and a used section for receiving the dental floss as it is used and arranged in a manner to be rotated to move the dental floss from the new section to the used section.

Still another object of the invention proposes the provision of a ratchet means within the casing arranged in a manner to limit rotation of the drum to advance the dental floss from the new section to the used section.

Still further the invention proposes extending a web of the dental floss from the casing in a manner to be extended over the fingers so that the web which is extended between the fingers may be used.

Another object of the invention proposes constructing the fingers of the telescopically engaged sections resiliently urged apart and mounted in a manner to be compressed under the tension of the web of dental floss moving from the new section of the drum. This resilient construction of the fingers permits a compensation to automatically take place as a greater portion of the dental floss becomes wound on the used section and unwound from the new section.

It is a further object of this invention to construct a sanitary dental floss holder which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a perspective view of a sanitary dental floss holder constructed in accordance with this invention.

Fig. 2 is a plan view of the sanitary dental floss holder with the cover removed.

Fig. 3 is a vertical sectional view taken substantially on the line 3—3 of Fig. 2.

Fig. 4 is a sectional view taken on the line 4—4 of Fig. 2.

Fig. 5 is a perspective view of the spindle used for supporting the drum.

Fig. 6 is an enlarged partial vertical sectional view of one of the fingers taken on the line 6—6 of Fig. 2.

The sanitary dental floss holder, according to this invention includes a casing 10 constructed of plastic or similar material and having an open top, closed by means of a removable cover 11. The cover is releasably held in position by means of several screws 12 or other suitable means.

A drum 13 for dental floss 14 is mounted within casing 10. The drum 13 has a central wall 15 dividing it into a new section 16 for new dental floss and a used section 17 for receiving used dental floss. The drum 13 is provided with a squared center opening 18 adapted to be engaged upon the squared portion 19 of the spindle 20 extended through the casing from side to side. One end of the spindle 20 is provided with an external knob 21 by which it may be turned. The dental floss 14 on the drum 13 has its new portion wound in one direction while the used portion of the dental floss is wound in the opposite direction upon the used section 17 of the drum. Thus, when the drum 10 is turned continuously in one direction the dental floss 14 will be advanced to be unwound from the new section 16 of the drum and to be rewound upon the used section 17.

Means is provided in connection with the drum 13 within the casing 10 for limiting rotation of the drum to unwind the new section of the dental floss 14 and wind up the used section. This means comprises a ratchet wheel 22 formed integrally upon one side of the drum. This ratchet wheel 22 is engaged by a resilient pawl 23. The resilient pawl 23 has one end engaging the teeth of the ratchet wheel 22. The opposite end of the resilient pawl 23 is fixedly attached to the base wall of the casing 10 by means of several rivets 24.

A means is provided for releasably retaining the spindle 20 in position within the casing 10 with the drum 13 in position thereon. This means comprises a small reduced portion 25 formed upon the end of the spindle 20 and which is projected from the side wall of the casing 10. This projected end is provided with threads and is adapted to have a nut 26 engaged thereon to removably hold the spindle 20 in position.

The front of the casing 10 is provided with a pair of spaced fingers 26. The spaced fingers 26 are each formed of telescopically engaged sections 27. A spring 28, of the expansion type, is provided between the adjacent ends of the sections 27 of each of the fingers 26 for urging them into an extended position. A web portion 14a of the dental floss 14 is extended through openings 29 formed in the casing 10 adjacent the base of the fingers 26. The web portion 14a after being passed through the opening 29, after being unwound from the new section 16 of the drum 13, is extended along a groove 30 formed in the side of one of the fingers 26 and is then extended through eyes 30a formed at the top end of the grooves 30 and then extended across the end of the fingers 26 and back along the groove 30 formed in the other of the fingers. The end of the web portion 14a is then extended through the opening 29 adjacent this latter finger and into casing 10 to be attached to the used section 17 of the drum 13. The drum 13 may then be turned through the medium of the spindle 20 to advance the dental floss from the new section 16 to the used section 17 of the drum 13. The resilient construction of the fingers 26 tends to permit the length of the sections 27 to automatically adjust themselves to compensate for the tension of the dental floss 14 as it is wound and unwound from the sections 16 and 17 of the drum 13.

It is proposed that drum 13 be provided for use in the casing 10, with the dental floss all wound upon the new section 16 thereof so that the end thereof may be unwound and extended from the casing around the fingers 26 and back into the casing 10 to be attached to the used section 17 of the drum 13. When the new floss 14 is in position within the casing it may be advanced to expose new portions of the web to be used for cleaning food particles and other materials from their lodged position between the adjacent faces of the teeth.

To accomplish this it is proposed that the casing 10 be gripped in one hand permitting the free ends of the fingers 26 to be inserted into the mouth so that the dental floss exposed between the ends of the fingers may be pressed downwards between the adjacent faces of the teeth to remove the material therebetween.

It is proposed to provide a spare drum of dental floss 14a which may be interchanged with the original drum 13 after it is fully used. This spare drum of dental floss 14a is held on spindle 20a similarly to the drum held on spindle 20.

It is also proposed to provide a sanitary cap 10a, adapted to cover the spaced fingers 26, when the device is not in use.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. A sanitary dental floss holder comprising a casing for a dental floss drum, a drum for dental floss mounted in said casing and having a new section for new dental floss and a used section for receiving used dental floss, and a pair of spaced fingers projecting from said casing and having passages for holding a web of said dental floss as it extends from said new drum section to said used drum section, said fingers being constructed of separate telescopically engaged sections and resilient means for extending said sections.

2. A sanitary dental floss holder comprising a casing for a dental floss drum, a drum for dental floss mounted in said casing and having a new section for new dental floss and a used section for receiving used dental floss, and a pair of spaced fingers projecting from said casing and having passages for holding a web of said dental floss as it extends from said new drum section to said used drum section, said fingers being constructed of separate telescopically engaged sections and resilient means for extending said sections, each of said fingers, comprising a solid section formed integrally with said casing and an outer tubular section slidably engaging said inner section and having a closed outer end.

3. A sanitary dental floss holder, comprising a casing for a dental floss drum, a drum for dental floss mounted in said casing and having a new section for new dental floss and a used section for receiving used dental floss, and a pair of spaced fingers projecting from said casing and having passages for holding a web of said dental floss as it extends from said new drum section to said used drum section, said fingers being constructed of separate telescopically engaged sections and resilient means for extending said sections, said passages being formed continuously along the sections of said fingers.

4. A sanitary dental floss holder, comprising a casing for a dental floss drum, a drum for dental floss mounted in said casing and having a new section for new dental floss and a used section for receiving used dental floss, and a pair of spaced fingers projecting from said casing and having passages for holding a web of said dental floss as it extends from said new drum section to said used drum section, said fingers being constructed of separate telescopically engaged sections and resilient means for extending said sections, each of said fingers, comprising a solid section formed integrally with said casing and an outer tubular section slidably engaging said inner section and having a closed outer end, said resilient means for extending said sections, comprising an expansion spring mounted in the tubular sections of each of said fingers and operating between the ends of said solid sections and the adjacent faces of the closed ends of said tubular sections.

JOSEPH E. DEMBENSKI.